United States Patent
Han

(10) Patent No.: US 9,507,375 B2
(45) Date of Patent: Nov. 29, 2016

(54) DISPLAY APPARATUS AND METHOD FOR RECOGNIZING LOCATION

(75) Inventor: Kuk-hyun Han, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1399 days.

(21) Appl. No.: 11/967,355

(22) Filed: Dec. 31, 2007

(65) Prior Publication Data
US 2008/0303682 A1    Dec. 11, 2008

(30) Foreign Application Priority Data

Jun. 5, 2007   (KR) .................. 10-2007-0055263
Aug. 29, 2007  (KR) .................. 10-2007-0087282

(51) Int. Cl.
*G06F 1/16*     (2006.01)
*G06F 3/041*    (2006.01)
*G06F 3/00*     (2006.01)

(52) U.S. Cl.
CPC ............... *G06F 1/1601* (2013.01); *G06F 3/00* (2013.01); *G06F 3/041* (2013.01); *G06F 3/0412* (2013.01); *G06F 3/0416* (2013.01)

(58) Field of Classification Search
CPC ........ G06F 3/00; G06F 3/041; G06F 3/0412; G06F 3/0416; G06F 1/1601
USPC .............. 345/173, 156–158, 162; 340/686.1, 340/686.5–686.6, 854.6
See application file for complete search history.

(56) References Cited

U.S. PATENT DOCUMENTS

| | | | |
|---|---|---|---|
| 6,377,888 B1* | 4/2002 | Olch ............................ | 701/505 |
| 6,738,628 B1* | 5/2004 | McCall et al. ............. | 455/456.1 |
| 6,750,769 B1* | 6/2004 | Smith ........................ | 340/572.1 |
| 7,966,269 B2* | 6/2011 | Bauer et al. ................. | 706/12 |
| 2005/0172215 A1* | 8/2005 | Squibbs ............... | G06K 7/0095 715/201 |
| 2005/0185215 A1 | 8/2005 | Nishizawa et al. | |
| 2005/0246094 A1 | 11/2005 | Moscatiello | |
| 2006/0055552 A1* | 3/2006 | Chung et al. ............ | 340/686.1 |
| 2006/0071790 A1 | 4/2006 | Duron et al. | |
| 2006/0128408 A1* | 6/2006 | Perttila et al. ............. | 455/466 |

(Continued)

FOREIGN PATENT DOCUMENTS

| | | |
|---|---|---|
| JP | 2001183455 A | 7/2001 |
| JP | 200299385 A | 4/2002 |

(Continued)

OTHER PUBLICATIONS

Notice of Allowance, dated Aug. 29, 2012. issued by the Korean Intellectual Property Office in counterpart Korean Application No. 10-2007-0087282.

(Continued)

*Primary Examiner* — Jonathan Horner
(74) *Attorney, Agent, or Firm* — Sughrue Mion, PLLC

(57) ABSTRACT

Provided are a display apparatus and method for recognizing locations. The display apparatus recognizes a location, and communicates with an external device having a tag reader. The display apparatus includes a display unit; a plurality of tags disposed on the display unit, each tag having a different identification (ID); a location information storage unit in which location information of each tag is stored; and a control unit which determines a location of the external device by comparing the ID with the location information stored in the location information storage unit, if the tag ID recognized by the external device is received from the external device.

23 Claims, 6 Drawing Sheets

(56) References Cited

U.S. PATENT DOCUMENTS

| | | |
|---|---|---|
| 2006/0171753 A1 | 8/2006 | Fessler et al. |
| 2007/0143715 A1* | 6/2007 | Hollins et al. ............... 715/863 |
| 2008/0198138 A1* | 8/2008 | McFarlane et al. .......... 345/173 |

FOREIGN PATENT DOCUMENTS

| | | |
|---|---|---|
| JP | 2004-234646 A | 8/2004 |
| JP | 200672657 A | 3/2006 |
| KR | 10-2002-0012244 A | 2/2002 |
| KR | 10-2006-0062114 A | 6/2006 |
| KR | 10-2006-0068567 A | 6/2006 |
| KR | 10-2007-0014537 A | 2/2007 |
| WO | 2005106767 A1 | 11/2005 |
| WO | 2007020546 A2 | 2/2007 |

OTHER PUBLICATIONS

Communication dated Jan. 24, 2013 issued by the European Patent Office in counterpart European Application No. 08151464.8.
Communication dated Dec. 4, 2012 issued by the Japanese Patent Office in counterpart Japanese Application No. 2008-126419.
Office Action dated Sep. 24, 2013, issued by the Japanese Patent Office in corresponding Application No. 2008-126419.

* cited by examiner

DISPLAY APPARATUS AND METHOD FOR RECOGNIZING LOCATION

CROSS-REFERENCE TO RELATED PATENT APPLICATION

This application claims priority from Korean Patent Application No. 10-2007-0055263 filed on Jun. 5, 2007, and Korean Patent Application No. 10-2007-0087282 filed on Aug. 29, 2007, in the Korean Intellectual Property Office, the disclosures of which are incorporated herein in their entirety by reference.

BACKGROUND OF THE INVENTION

1. Field of the Invention

Apparatuses and methods consistent with the present invention relate to an interface of a display apparatus, and more particularly, to a display apparatus and method for recognizing locations of external devices such as a cellular phone, a digital camera, a camcorder, or a personal digital assistant (PDA).

2. Description of the Related Art

Related art display apparatuses for recognizing external devices use one of a radio frequency identification (RFID) technique, a camera, and a global positioning system (GPS). An apparatus using the RFID technique includes a radio frequency (RF) reader which can read and decode, an RFID tag having unique information stored thereon, application software, and a network. The RF reader is installed on the outside of the display apparatus and the RFID tag is attached to the external device, and therefore the RF reader senses an identification (ID) of the external device. A method of an apparatus using the camera includes installing the camera under or on the top of a table display, and sensing a location of the external device. In an apparatus using the GPS, a GPS receiver estimates an exact time and distance from more than three measuring units, and each of three distances is calculated by using a triangle method to recognize a location of the external device.

However, according to the related art technique, when a reader such as an RFID reader is installed on the outside of the display apparatus, information simply showing that an external device having a predetermined ID is in front of the display apparatus is indicated without showing a location of the device. Although a location of the external device can be detected by using the camera, a recognition rate may be low and a high processing capability is required, since image processing is performed by the camera. When using the GPS, an error of the location in a small place such as a display apparatus is increased, a device may become complicated to implement, and costs may be increased.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus and method for recognizing a location of an external device by using a tag on a display device.

According to an aspect of the present invention, there is provided a display apparatus recognizing a location, which communicates with an external device having a tag reader, the display apparatus including a display unit; a plurality of tags disposed on the display unit, each tag having a different ID; a location information storage unit storing location information of each tag; and a control unit determining a location of the external device by comparing an ID with location information stored in the location information storage unit, when a tag ID recognized by the external device is received from the external device.

The tags may be disposed in the front or rear side of the display unit.

If there are a plurality of received IDs, the control unit may determine a center location between corresponding tags as a location of the external device, based on the plurality of IDs and location information stored in the location information storage unit.

The display apparatus may further include a communication unit communicating with the external device by using at least one of a wired method and a wireless method.

The display unit may include a touch screen panel sensing an input by a user.

When the ID is received from the external device and the touch screen panel senses one or more inputs, the control unit may determine a location of a corresponding tag based on the received ID and the location information stored in location information storage unit, and may determine a location closest to the external device as a location of the external device.

If there are a plurality of received IDs, the control unit may determine a center location between corresponding tags based on the plurality of IDs and the location information stored in the location information storage unit, and determines a location closest to the center location as a location of the external device.

The control unit may determine a direction of the external device at the determined location of the external device, based on location information sensed by the touch screen.

The display device may further include a tag writer that records predetermined information on one of the tags, and a tag antenna that allows communication to be established between each of the tags and the tag writer.

According to another aspect of the present invention, there is provided a display apparatus recognizing a location, which communicates with an external device having a tag reader, the display apparatus including a display unit; a plurality of tags disposed on the display unit, each having different location information; and a control unit determining a location of the external device, based on location information, when location information of the tags recognized by the external device is received from the external device.

According to another aspect of the present invention, there is provided a method of recognizing a location of an external device having a tag reader, the method including receiving an ID recognized by the external device; and determining a location of the external device, based on the received ID and location information of the ID.

According to another aspect of the present invention, there is provided a method of recognizing an external device having a tag reader, the method including sensing an input by using a display unit having a touch screen panel; receiving an ID recognized by the external device; and determining a location of a corresponding tag, based on the received ID and the location information of the ID and determining a location closest to the corresponding tag from among location coordinates sensed by the touch screen as the location of the external device.

If there are a plurality of IDs and location information, determining of the location of the external device by calculating the location of the external device may include determining a center location between corresponding tag coordinates based on the plurality of IDs and the location information of the plurality of IDs; mapping location coordinates sensed by the touch screen closest to the center location of the tag coordinates; and determining the mapped coordinates as a location of the external device.

According to another aspect of the present invention, there is provided an apparatus for communicating with an external device having a tag reader, the apparatus comprising: a display unit; a plurality of tags disposed on the display unit; a tag writer recording predetermined information in the plurality of tags, where the predetermined information includes location information; and a control unit determining a location of the external device according to the predetermined information, when the external device recognizes the predetermined information and the predetermined information is received from the external device.

The tags may be located in a rear side of the display unit.

The display apparatus may further include a tag antenna allowing communication to be established between each of the tags and the tag writer.

The tag writer and the tag antenna may be located on a rear side of the display unit.

The predetermined information may include text information.

According to another aspect of the present invention, there is provided a method of recognizing a location of an external device having a tag reader, the method including: if predetermined information is displayed on a display unit, a tag writer recording the predetermined information and location information of the predetermined information in a tag; receiving the predetermined information and the location information from the external device if the external device recognizes the predetermined information and location information; and determining the location of the external device based on the received predetermined information and location information.

The recording of the predetermined information and the location information may include the tag writer recording the predetermined information and the location information in a tag via a tag antenna if the predetermined information is displayed on the display unit.

As described above, the present invention provides a display apparatus and method for recognizing the locations of external devices on a display device in real-time. Therefore, interaction between each external device and the display apparatus is possible. The present invention is easy to realize and economical in terms of cost. Also, the present invention can be applied to a web-based home appliance and a wall display having a simple and adaptive interface. Also, according to the present invention, simple text information can be recorded in a tag so that this information can be easily used by an external device without being reprocessed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The attached drawings illustrate exemplary embodiments of the present invention, and are referred to in order to gain a sufficient understanding of the present invention and its merits and objectives.

Figure 1:
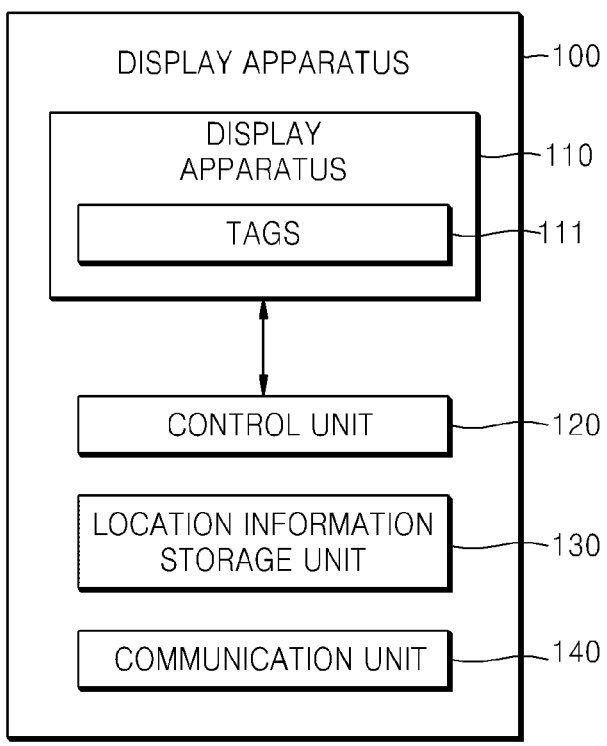
FIG. 1 is a block diagram illustrating a display apparatus according to an exemplary embodiment of the present invention.

FIG. 1 is a block diagram illustrating a display apparatus according to an exemplary embodiment of the present invention.

Referring to FIG. 1, the display apparatus 100 includes a display unit 110, a control unit 120, a location information storage unit 130, and a communication unit 140. The display unit 110 includes tags 111.

An electronic tag is a type of Automatic Identification and Data Capture (AIDC) technique which reads data stored in an electronic tag having a microchip by using a radio frequency in a non-contact manner. A tag semiconductor chip and an antenna wirelessly transmit data within a distance of a few meters to several tens of meters, and the reader receives a signal and decodes the data. The electronic chip is a very small chip, which stores information and transmits the information. Also, the electronic chip transmits the stored information when receiving a high RF signal. The type of tag is not limited to the electronic chip, and may vary, such as an electronic tag or an image tag, as long as an ID can be identified. A plurality of tags 111 according to the present exemplary embodiment include IDs which are different from each other. The IDs are unique identification numbers for corresponding tags. The location information storage unit 130 stores location information about each tag. The location information is information about coordinates indicating where the corresponding tag is placed on the display unit 110. When an ID is received from an external device 220 (see FIG. 2) having a tag reader, the control unit 120 determines a location of the external device 220 based on the ID and the location information stored in the location information storage unit 130. When the external device 220 approaches a tag located on the display unit 110, the external device 220 reads data about an ID of the tag. The external device 220 then transmits the read tag ID to the display apparatus 100. The control unit 120 in the display apparatus 100 finds out a location of the corresponding tag according to the received tag ID and the location information stored in the location information storage unit 130, and then determines the location as the location of the external device.

Figure 2:
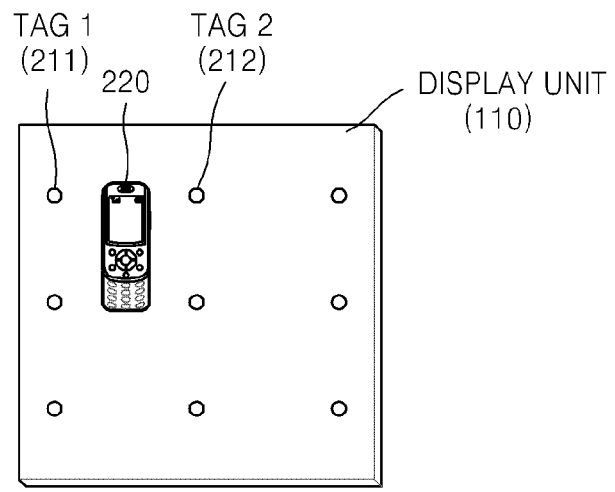
FIG. 2 illustrates a display unit according to an exemplary embodiment of the present invention.

An arrangement of tags will be explained with reference to FIG. 2. FIG. 2 illustrates a display unit according to an exemplary embodiment of the present invention. Referring to FIG. 2, a plurality of tags can be disposed in the front and/or rear sides of the display unit 110. On the front side, transparent tags such as image tags can be disposed, and any types of tags can be disposed on the rear side of the display unit 110. Tags may be disposed a predetermined distance apart from each other. As the number of tags is increased, the accuracy of obtained location information of the external device 220 increases. The external device 220 includes a tag reader and a communication unit. The external device 220 is a consumer electronics (CE) device for communication, such as a cellular phone, a Moving Picture Experts Group (MPEG) layer 3 Player (MP3P), or a Portable Media Player (PMP), but the type of external device 220 is not limited to these devices. The tag reader converts signals received from the tag, or stores data of the signal in a memory that is a storage device while verifying the signal of the data, and transmits the data later if necessary. Currently, there are cellular phones with tag readers on the market. The communication unit can transmit an ID recognized from the tag to the display apparatus together with unique information of the external device 220.

Also, if the external device 220 is located within a distance where the tag can be recognized, a plurality of tags can be recognized at once or sequentially. When the external device 220 recognizes a plurality of IDs and transmits the IDs, the display apparatus receives the plurality of IDs. In this case, the control unit determines a location that is the center of corresponding tags as a location of the external device 220, based on the plurality of IDs and the location information stored in the information storage unit. For example, referring to FIG. 2, when the external device 220 recognizes a tag "1" 211 and a tag "2" 212, and transmits IDs of the tags to the display apparatus, the display apparatus receives the IDs of the tag "1" 211 and the tag "2" 212. In this case, the control unit determines a center location between the tag "1" 211 and the tag "2" 212 based on the location information stored in the location information storage unit, and determines a location of the external device 220, assuming that the external device 220 is located in the middle of the tags 211 and 212.

The tags 111 may include their own location information. In this case, when location information is received from the external device 220 having a tag reader, the control unit 120 determines a location of the external device 220 based on the location information.

The communication unit 140 receives an ID recognized by the external device 220 from the external device 220.

The above explanation is given, assuming that a location of a single external device is to be determined. The external device has its own unique information and may transmit the unique information together with the recognized ID. The unique information of the external device may include information indicating what type of device the external device is (for example, a cellular phone, a MP3P, or a PMP). When a plurality of external devices are placed in the display apparatus, the display apparatus receives the unique information of each of the external devices, and determines a location of the single external device according to locations of corresponding tags having unique information of the same external device. Accordingly, when a plurality of IDs are received, it is determined whether the plurality of IDs are a result of a single external device or a plurality of external devices, and a location is then determined.

Figure 3:
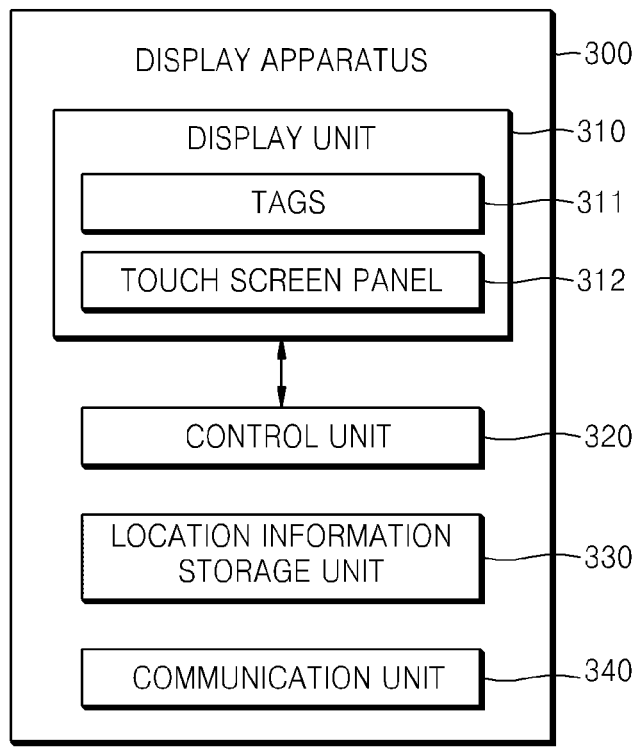
FIG. 3 is a block diagram illustrating a display apparatus according to another exemplary embodiment of the present invention.

FIG. 3 is a block diagram illustrating a display apparatus according to another exemplary embodiment of the present invention.

Referring to FIG. 3, the display apparatus 300 includes a display unit 310, a control unit 320, a location information storage unit 330, and a communication unit 340. Also, the display unit 310 includes tags 311 and a touch screen panel 312. The display unit 310, the tags 311, and the communication unit 340 according to the exemplary embodiment of the present invention are similar to the components which have been previously explained, and therefore a detailed explanation thereof will be omitted here.

The display unit 310 includes the touch screen panel 312 which senses an input of a user regarding an external device. The touch screen panel may be a multi-touch screen. An ID is received from the external device, and the touch screen may sense one or more inputs. For example, the touch screen can sense more than two inputs when the touch of a user's finger is sensed while the external device is in contact with the touch screen panel. When the touch screen panel senses another input other than the external device, a location of the external device can be incorrectly determined. In order to solve this problem, the control unit 320 may determine a location of a corresponding tag 311 based on the received ID and the location information stored in the location information storage unit 330, and may determine a location of the external device as the closest location to the corresponding tag 311 from among locations sensed by the touch screen 312.

Figure 4:
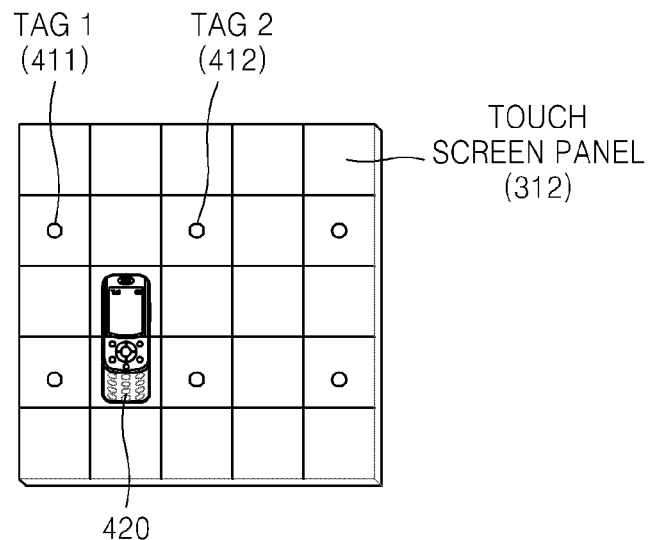
FIG. 4 illustrates a display unit having a touch screen panel according to an exemplary embodiment of the present invention.

Also, if the external device is located within a distance where the tag can be sensed, a plurality of tags can be recognized at once or sequentially. When the external device recognizes a plurality of IDs and transmits the IDs, the display apparatus receives a plurality of IDs. In this case, a center location of corresponding tags is determined, based on the plurality of IDs and the location information stored in the location information storage unit 330. For example, referring to FIG. 4, when an external device 420 recognizes a tag "1" 411 and a tag "2" 412 and transmits the IDs of the tags to a display apparatus, the display apparatus receives the IDs of the tag "1" 411 and the tag "2" 412. In this case, a control unit determines a center location between the tag "1" 411 and the tag "2" 412 and determines the center location. Then, the control unit 420 may determine a location of the external device as the closest location to the center location from among locations sensed by the touch screen.

The tags 311 may include their own unique location information. In this case, when location information is received by the display apparatus from the external device 420 having a tag reader and the touch screen panel senses one or more inputs, the control unit 320 determines a location of a corresponding tag based on the received location information, and determines a location of the external device as the location closest to the location of the corresponding tag from among locations sensed by the touch screen.

The above explanation is given, assuming that a location of a single external device is to be determined. The external device has its own unique information and may transmit the unique information together with the recognized ID. When a plurality of external devices are placed in the display unit, the display unit receives the unique information of each of the external devices, and determines a location of the single external device according to locations of corresponding tags having unique information of the same external device. Accordingly, when a plurality of IDs are received, it is determined whether the plurality of IDs are a result of a single external device or a plurality of external devices, and a location of the external device is then determined.

Also, a direction of the external device can be determined at the determined location of the external device by calculating all location information of the external device sensed by the touch screen.

Figure 5:
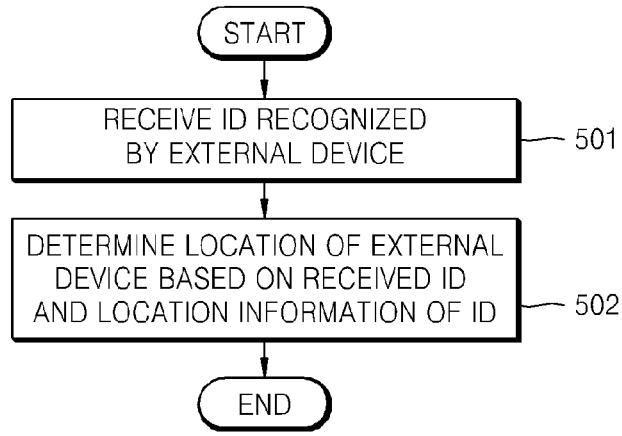
FIG. 5 is a flowchart of a method of recognizing a location of an external device according to an exemplary embodiment of the present invention.

FIG. 5 is a flowchart of a method of recognizing a location of an external device according to an exemplary embodiment of the present invention.

Figure 6:
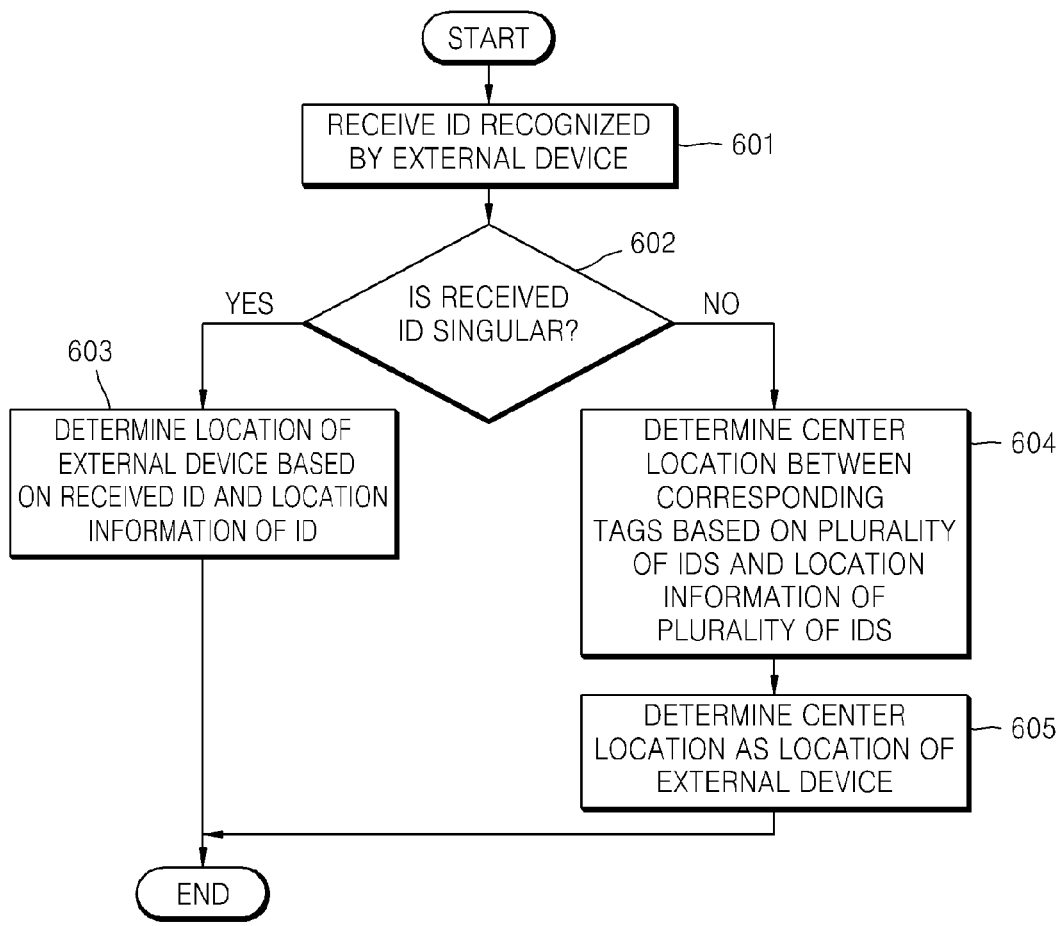
FIG. 6 is a flowchart of a method of recognizing a location of an external device according to another exemplary embodiment of the present invention.

Referring to FIG. 5, when the external device having a tag reader approaches or makes contact with a display apparatus having a tag, data about an ID stored in the tag is recognized. The display apparatus then receives the recognized ID (operation 501). A control unit determines a location of the external device based on the received ID and the location information of the ID (operation 502). FIG. 6 is a flowchart of a method of recognizing a location of an external device according to another exemplary embodiment of the present invention.

Referring to FIG. 6, a display apparatus receives an ID recognized by an external device (operation 601). If the ID recognized by the external device is singular (YES in operation 602), a location of the external device is determined based on the received ID and the location information of the corresponding ID (operation 603). If a plurality of IDs are recognized by the external devices (NO in operation 602), a center location between corresponding tags is determined (operation 604) based on the plurality of IDs and the location information for the corresponding plurality of IDs, and thus the center location is determined as a location of the external device (operation 605).

Figure 7:
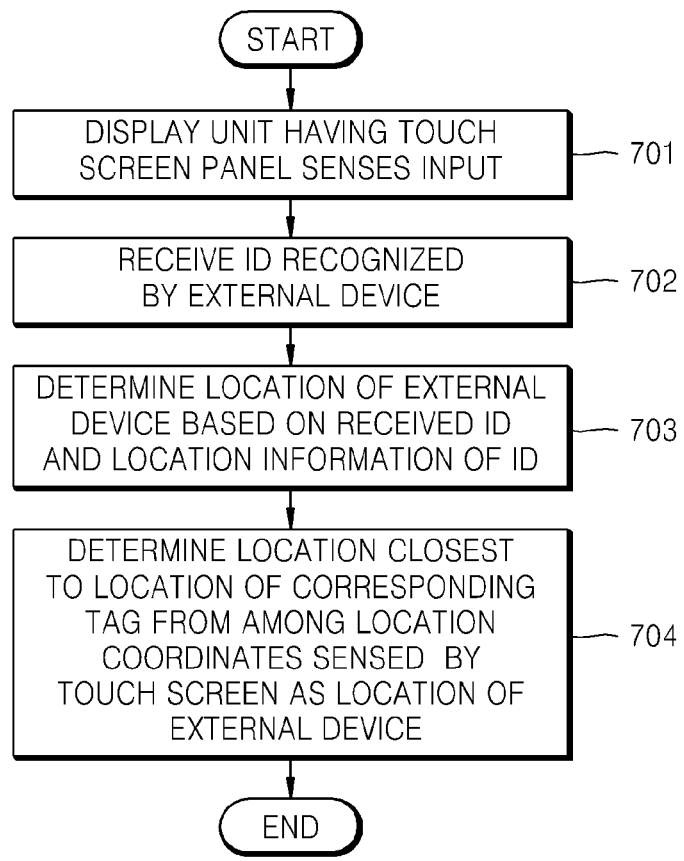
FIG. 7 is a flowchart of a method of recognizing a location of an external device on a touch screen panel.

FIG. 7 is a flowchart of a method of recognizing a location of an external device on a touch screen panel.

Referring to FIG. 7, when the external device having a tag reader approaches or makes contact with a display unit having a tag and a touch screen panel, data for an ID stored in the tag is recognized. The display unit having the touch screen panel senses an input at once or sequentially (operation 701). The ID recognized by the external device is then received (operation 702). A control unit determines a location of a corresponding tag based on the received ID and the location information for the received ID (operation 703). The location closest to the location of the corresponding tag is determined as a location of the external device from among location coordinates sensed by the touch screen (operation 704).

Figure 8:
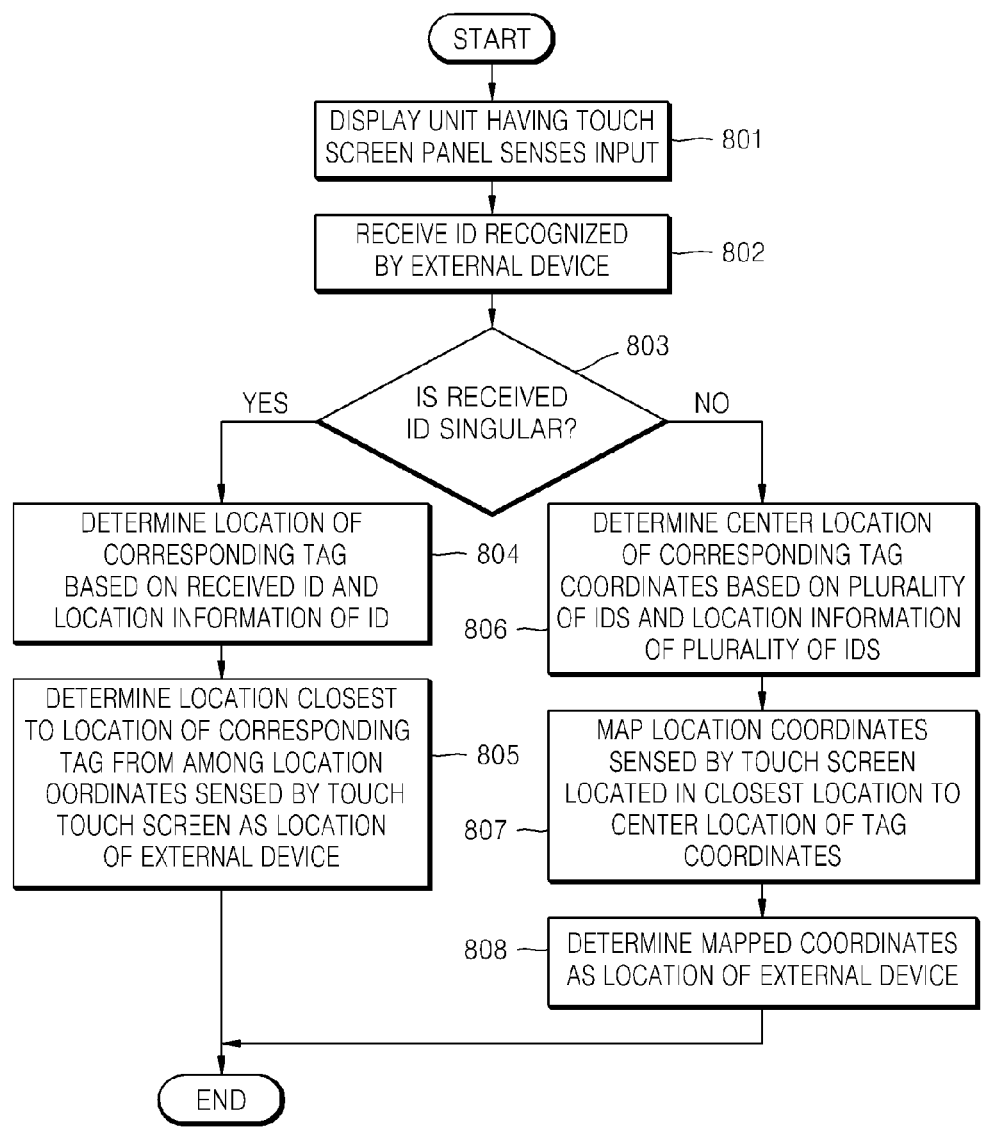
FIG. 8 is a flowchart of a method of recognizing a location at a touch screen panel of an external device according to another exemplary embodiment of the present invention.

FIG. 8 is a flowchart of a method of recognizing a location at a touch screen panel of an external device according to another exemplary embodiment of the present invention.

Referring to FIG. 8, a display apparatus having the touch screen panel senses an input (operation 801), and then an ID recognized by the external device is received (operation 802). If the ID is singular (YES in operation 803), a location of a corresponding tag is determined (operation 804) based on the received ID and the location information of the received ID. The location closest to the location of the corresponding tag is determined as the location of the external device (operation 805) from among location coordinates sensed by the touch screen. If there are a plurality of IDs (NO in operation 803), a center location between the corresponding tag coordinates is determined based on the plurality of IDs and the location information of the plurality of IDs (operation 806). Mapping is conducted on location coordinates sensed by the touch screen closest to the center location of the tag coordinates (operation 807). The mapped coordinates are determined as a location of the external device (operation 808).

Figure 9:
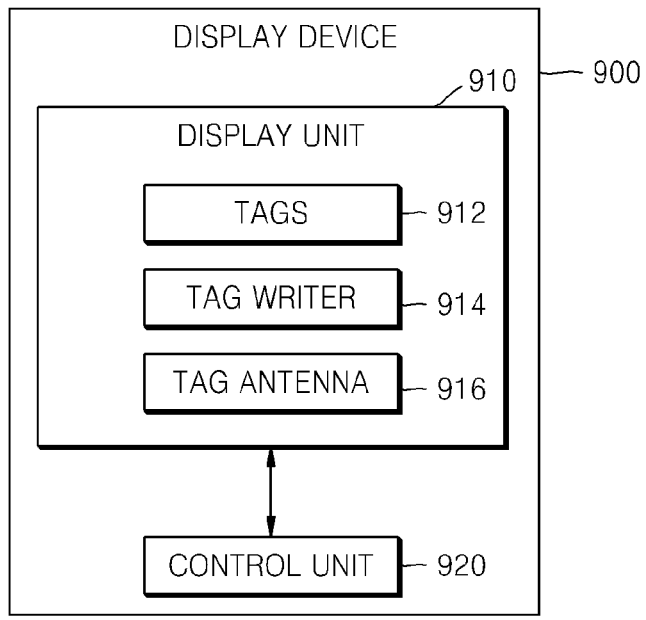
FIG. 9 is a block diagram illustrating a display apparatus according to another exemplary embodiment of the present invention.

FIG. 9 is a block diagram of a display apparatus 900 according to another exemplary embodiment of the present invention.

Referring to FIG. 9, the display apparatus 900 includes a display unit 910 and a control unit 920. The display unit 910 includes tags 912, a tag writer 914, and a tag antenna 916. The constructions of the display unit 910 and the tags 912 are respectively the same as those of the display unit 110 and the tags 111 illustrated in FIG. 1, and thus a detailed description thereof will be omitted.

When predetermined information is displayed on the display unit 910, the tag writer 914 records the predetermined information in a tag at the location of the predetermined information on the display unit 910. In order to display predetermined information on the display unit 910, the display apparatus 900 transmits a command that the predetermined information be recorded at a predetermined location to both the display unit 910 and the tag writer 914. The tag writer 914 receiving the command records information regarding the predetermined location and the predetermined information in the tag at the predetermined location. The predetermined information is text information and/or graphic information.

The tag antenna 916 enables communication to be established between the tag 912 and the tag writer 914. The tag writer 914 can record information in the tag 912 via the tag antenna 916. The tag writer 914 and the tag antenna 916 may be located on the rear side of the display unit 910.

An external device (not shown) having a tag reader receives the information regarding the predetermined location and the predetermined information from the tag 912 at the predetermined location in order to access the display unit 910 that displays the predetermined information. The external device can directly read the displayed information by using the tag 912. If the display device 900 receives location information recognized by the external device, the control unit 920 detects the location of the tag 912 based on the location information and then determines the detected location as the location of the external device.

Figure 10:
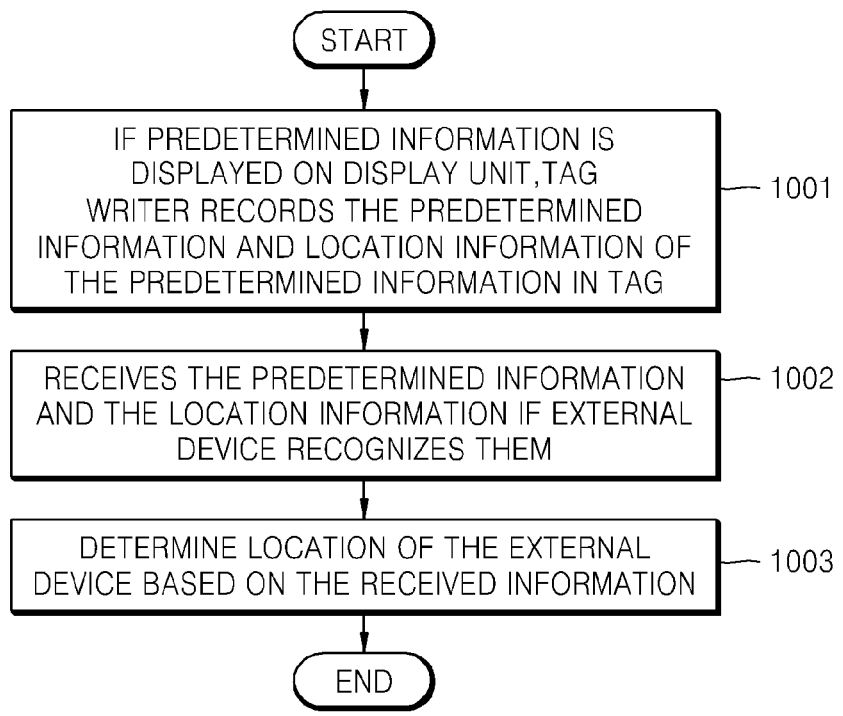
FIG. 10 is a flowchart of a method of recognizing a location of an external device according to another exemplary embodiment of the present invention.

FIG. 10 is a flowchart illustrating a method of recognizing the location of an external device according to another exemplary embodiment of the present invention. Referring to FIG. 10, if predetermined information is displayed on a display unit, a tag writer records the predetermined information and location information regarding the predetermined information in a tag (operation 1001). In this case, the predetermined information and the location information may be recorded in the tag via a tag antenna.

The external device reads the predetermined information and the location information from the tag and then the display device receives the location information from the external device (operation 1002).

Thereafter the location of the external device is determined according to the received location information (operation 1003). The location of the tag is determined to be that of the external device.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A display apparatus which recognizes a location of an external device and communicates with the external device having a tag reader, the display apparatus comprising:
   a display unit, implemented as hardware in the display apparatus;
   a plurality of tags included in the display unit, each of the tags having a different identification (ID);
   a location information storage unit in which location information of each of the tags is stored; and
   a communication unit which receives from the external device located exterior to the display apparatus, an ID of a tag recognized by the external device and unique information of the external device and provides the ID of the tag recognized by the external device and the unique information of the external device to a control unit,
   wherein the control unit compares the ID, which was read and recognized by the external device, with the location information stored in the location information storage unit, when the ID of the tag recognized by the external device is received from the external device; and
   wherein the control unit determines the location of the external device based on the location information corresponding to the received ID and at least one input sensed by a touch screen panel of the display unit.

2. The display apparatus of claim 1, wherein the tags are disposed in at least one of a front side and a rear side of the display unit.

3. The display apparatus of claim 1, wherein if a plurality of IDs are received, the control unit determines a center location between corresponding tags as a location of the external device, based on the plurality of IDs and location information stored in the location information storage unit.

4. The display apparatus of claim 1, wherein the communication unit communicates with the external device via at least one of wired communication and wireless communication.

5. The display apparatus of claim 1, wherein if the ID is received from the external device and the touch screen panel senses the at least one input, the control unit determines a location of a corresponding tag based on the received ID and location information stored in the location information storage unit, and determines a location closest to the corresponding tag from among location coordinates associated with the at least one input sensed by the touch screen as a location of the external device.

6. The display apparatus of claim 5, wherein if a plurality of IDs are received, the control unit determines a center location between corresponding tags based on the plurality of IDs and the location information stored in the location information storage unit, and determines a location closest to the center location as a location of the external device.

7. The display apparatus of claim 5, wherein the control unit determines a direction of the external device at the determined location of the external device, based on location information sensed by the touch screen.

8. The apparatus of claim 1, further comprising:
   a tag writer which records predetermined information in the plurality of tags; and
   a tag antenna through which communication is established between each of the tags and the tag writer.

9. A display apparatus which recognizes a location of an external device and communicates with the external device having a tag reader, the display apparatus comprising:
   a display unit, implemented as hardware in the display apparatus;
   a plurality of tags included in the display unit, each of the tags having different location information; and
   a communication unit which receives from the external device located exterior to the display apparatus, location information of a tag recognized by the external device and unique information of the external device and provides the location information of the tag recognized by the external device and the unique information of the external device to a control unit,
   wherein the control unit determines the location of the external device, based on the location information which was read and recognized by the external device and at least one input sensed by a touch screen panel of the display unit, when the location information of the tags recognized by the external device is received from the external device.

10. The display apparatus of claim 9, wherein the tags are disposed in at least one of a front side and a rear side of the display unit.

11. The display apparatus of claim 9, wherein if the location information is received from the external device and the touch screen panel senses the at least one input, the control unit determines a location of a corresponding tag based on the received location information, and determines a location among location coordinates associated with the at least one input sensed by the touch screen closest to the location of the corresponding tag as a location of the external device.

12. A method of recognizing a location of an external device having a tag reader, the method comprising:
   providing a plurality of tags included in a display unit, implemented as hardware in a display apparatus,
   receiving, by a communication unit of the display apparatus, from at least one of the plurality of tags an identification (ID) which was read and recognized by the external device located exterior to the display apparatus and unique information of the external device; and
   determining the location of the external device, based on location information of the received ID and at least one input sensed by a touch screen panel of the display unit.

13. The method of claim 12, wherein the determining the location of the external device comprises:
   if a plurality of IDs are received, determining a center location between corresponding tags based on the plurality of IDs and the location information of the plurality of IDs, and determining the center location as the location of the external device.

14. A method of recognizing an external device having a tag reader, the method comprising:
   providing a plurality of tags included in a display unit, implemented as hardware in a display apparatus;
   sensing at least one input by a user at a touch screen panel of the display unit;
   receiving, by a communication unit of the display apparatus, from at least one of the plurality of tags an identification (ID) which was read and recognized by the external device located exterior to the display apparatus and unique information of the external device; and determining a location of a corresponding tag based on the received ID and the location information of the ID, and determining a location closest to the corresponding tag from among location coordinates associated with the at least one input sensed by the touch screen as a location of the external device.

15. The method of claim 14, wherein the determining comprises:
   if a plurality of IDs and location information are received, determining a center location between corresponding tag coordinates based on the plurality of IDs and the location information of the plurality of IDs;
   mapping location coordinates sensed by the touch screen closest to the center location of the tag coordinates; and
   determining the mapped coordinates as a location of the external device.

16. An apparatus for communicating with an external device having a tag reader, the apparatus comprising:
   a display unit, implemented as hardware in the apparatus which displays predetermined information;
   a plurality of tags included in the display unit;
   a tag writer which records the predetermined information and location information of the predetermined information in the plurality of tags, the location information corresponding to a location of the displayed predetermined information on the display unit; and
   a communication unit which receives from the external device located exterior to the apparatus, predetermined information of a tag recognized by the external device and unique information of the external device and provides the predetermined information of the tag recognized by the external device and the unique information of the external device to a control unit,
   wherein the control unit determines a location of the external device according to the predetermined information, when the external device reads and recognizes the predetermined information and the predetermined information is received from the external device.

17. The apparatus of claim 16, wherein the tags are located in a rear side of the display unit.

18. The apparatus of claim 16, further comprising a tag antenna through with communication is established between each of the tags and the tag writer.

19. The apparatus of claim 18, wherein the tag writer and the tag antenna are located on a rear side of the display unit.

20. The apparatus of claim 16, wherein the predetermined information comprises text information.

21. A method of recognizing a location of an external device having a tag reader, the method comprising:
   providing a plurality of tags included in a display unit, implemented as hardware in a display apparatus;
   displaying predetermined information on the display unit;
   recording the predetermined information and location information of the predetermined information in the at least one of the plurality of tags, the location information corresponding to a location of the displayed predetermined information on the display unit;
   receiving, by communication unit of the display apparatus, the predetermined information and the location information from the external device if the external device located exterior to the display apparatus, reads and recognizes the predetermined information and location information; and
   determining the location of the external device based on the received predetermined information and location information.

22. The method of claim 21, wherein the recording of the predetermined information and the location information comprises recording the predetermined information and the location information in a tag via a tag antenna if the predetermined information is displayed on the display unit.

23. The display apparatus of claim 1, wherein the tag recognized by the external device is non-movable relative to the display unit.

* * * * *